(No Model.)
J. P. STEFFENS.
SPEED GEAR FOR BICYCLES.
No. 571,890. Patented Nov. 24, 1896.
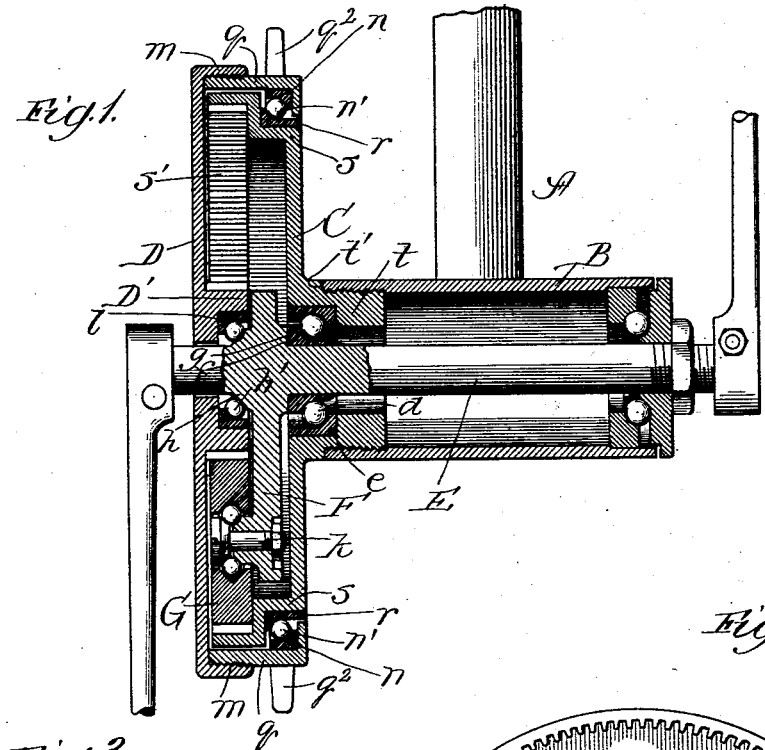
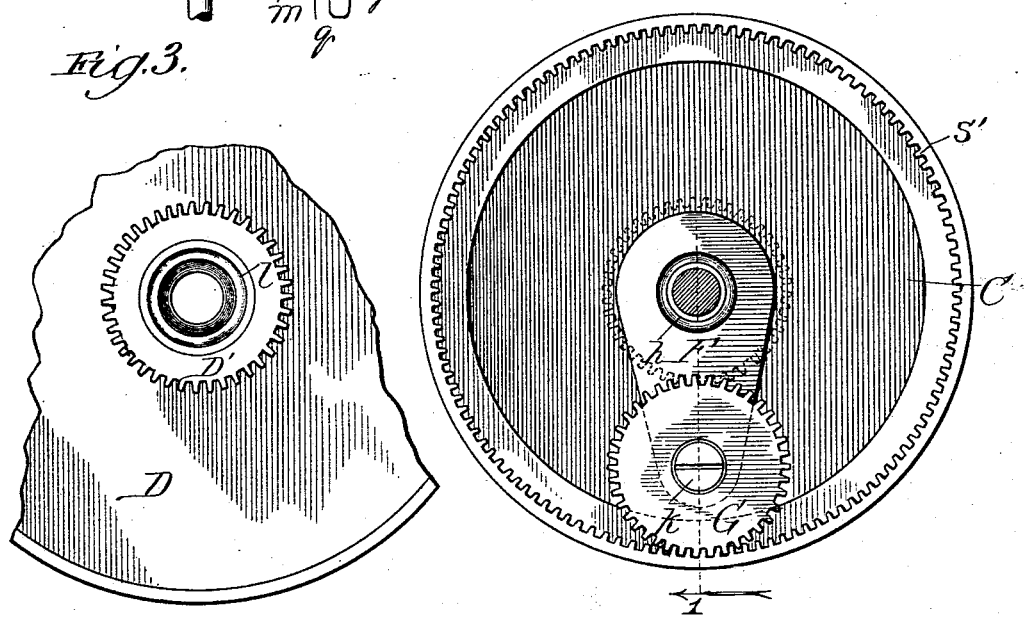
Witnesses:
Inventor
James P. Steffens,
By Dyrenforth & Dyrenforth
Attys

UNITED STATES PATENT OFFICE.

JAMES P. STEFFENS, OF CHICAGO, ILLINOIS, ASSIGNOR OF ONE-HALF TO FREDERICK HAAS, OF SAME PLACE.

SPEED-GEAR FOR BICYCLES.

SPECIFICATION forming part of Letters Patent No. 571,890, dated November 24, 1896.

Application filed June 1, 1896. Serial No. 593,738. (No model.)

*To all whom it may concern:*

Be it known that I, JAMES P. STEFFENS, a citizen of the United States, residing at Chicago, in the county of Cook and State of Illinois, have invented a new and useful Improvement in Speed-Gear for Bicycles, of which the following is a specification.

My invention relates to an improvement in speed-gears for safety-bicycles, and more especially to that type of speed-gears involving an annular gear-wheel held in rigid relation to the frame and a pinion working therein and loosely mounted upon a wrist-pin carried by an arm rigid with the pedal-shaft, said pinion meshing with a pinion connected with the sprocket-wheel and operating to turn the latter at a rate of speed depending upon the ratio of the diameters of the pinions and annular gear-wheel.

My invention consists in the novel arrangement and construction of the parts of said gearing and in the details of construction, as illustrated in the accompanying drawings and hereinafter described.

In the drawings, Figure 1 is a broken sectional view of a crank-hanger and crank-shaft of a bicycle with my improvements in place, the section being taken on line 1 of Fig. 2 and viewed as indicated; Fig. 2, an interior view of the annular gear-wheel employed, together with the pinion carried by an arm of the crank-shaft, the position which the pinion attached to the sprocket-wheel when in place would occupy being shown in dotted lines; and Fig. 3, an inner broken view of the disk which serves as a medium for connecting the pinion with the sprocket-wheel, the disk and pinion in this instance being cast integral.

A is a bicycle crank-hanger forming a part of the bicycle-frame and provided with a journal-box B, to one end of which is rigidly attached an annular gear-wheel C. As a preferred means of attaching the annular gear C to the journal-box, I provide it with a threaded sleeve $t$, which screws into the journal-box B, and to prevent its loosening any suitable securing means may be employed. The gear-wheel C is further provided with a shoulder $t'$, which fits against one end of the journal B, an offset $s$, adapted to receive a race for a ball-bearing, and an internally-cogged rim portion $s'$.

Upon the offset $s$ is fitted an inner ball-bearing race member $r$. Loosely encircling the annular gear-wheel C and the race member $r$ is a hubless sprocket-wheel having a comparatively wide rim $q$, a flange $q'$, and sprockets $q^2$. The sprocket-wheel is provided at the inner side of the rim with an outer race member $n$, which is forced against the shoulder afforded by the flange $q'$, and between which and the inner race member $r$ are confined balls $n'$. At its other edge the rim is provided with a thread for the reception of a cap or disk D, which is provided for the purpose with a threaded flange $m$. Attached to the disk D or cast integral therewith is a pinion D', provided internally with a recess for an outer race member $l$. The disk D is provided centrally with an opening for the crank-shaft E, as shown, and may be provided with any suitable means for preventing unscrewing under a reversal of power, as in sudden stoppage of the machine through the medium of the cranks.

Keyed to the crank-shaft E or formed integral therewith is an arm F, carrying a wrist-pin $k$, upon which is mounted to revolve freely thereon a pinion G, enmesh with the pinion D' on the disk D, and preferably provided with an antifriction-bearing, as shown. As illustrated in Fig. 1, the arm F is formed integral with the shaft E and is provided with a hub portion affording an inner race member $h$, acting with the outer race member $l$ to form a race-course for balls $h'$, and affording also a shoulder $g$, against which is forced an inner race member $f$ of another bearing.

The sleeve $t$ of the annular gear-wheel C is provided internally with a socket for the reception of an outer race member $e$, which acts with the race member $f$ to form a course for balls $d$.

At its opposite end the crank-shaft may be provided with any suitable ball-bearing, the one shown forming no part of the present invention.

In operation when the crank-shaft is turned through pressure upon the pedals the effect is to turn the arm F and exert pressure upon the pinion G through the wrist-pin $k$. The pinion G bears equally against the cogs of the annular gear-wheel and the pinion connected with the sprocket-wheel. The annular gear-wheel being fixed rigidly to the frame its effect is to revolve the gear G and rotate the pinion D' and with it the sprocket-wheel. The effect is to cause the pinion G to run rapidly around the annular gear and to turn the pinion D', as before stated, at a comparatively high rate of speed.

The construction shows a desirable means of increasing the speed of the wheel without increasing the size of the sprocket-wheel, since it is evident that the usual method of "speeding up" a bicycle by means of the sprocket-wheel and rear shaft-pinion may be, and indeed ordinarily would be, employed in connection with my improvement.

My improvement forms a particularly compact and desirable speed-gear for bicycles, taking up substantially no more room on the crank-shaft than the ordinary sprocket-wheel.

What I claim as new, and desire to secure by Letters Patent, is—

1. In a bicycle or similar vehicle, the combination of an annular gear-wheel C rigidly attached to one end of the pedal-shaft journal-box and provided externally toward its rim with a race member $r$ and internally with a race member $e$, a hubless sprocket-wheel encircling said gear and provided with a race member $n$ and threaded at one edge of its rim, a disk D provided with a threaded flange screwed upon said sprocket-wheel and with a pinion D' rigid with the disk, through the medium of which the latter is revolved, said parts being provided with antifriction-bearings, a pedal-shaft E provided with a rigidly-attached arm F carrying toward its outer end a wrist-pin $k$ and at its base the race member $f$ corresponding with the member $e$, and a pinion G loosely mounted upon said wrist-pin meshing with said annular gear and operative to turn the sprocket-wheel through the medium of the pinion D', substantially as described.

2. In a bicycle or similar vehicle, the combination of an annular gear-wheel C rigidly attached to one end of the pedal-shaft journal-box and provided externally toward its rim with a race member $r$ and internally with a race member $e$, a hubless sprocket-wheel encircling said gear and provided with a race member $n$ and threaded at one edge of its rim, a disk D provided with a threaded flange screwed upon said sprocket-wheel and a pinion D' through the medium of which the disk is revolved, said pinion D' being provided with a race member $l$, a pedal-shaft E provided with a rigidly-attached arm F carrying toward its outer end a wrist-pin $k$ and at its base race members $h$ and $f$, and a pinion G loosely mounted upon said wrist-pin meshing with said annular gear and operative to turn the sprocket-wheel through the medium of the pinion D', substantially as described.

JAMES P. STEFFENS.

In presence of—
J. H. LEE,
R. T. SPENCER.